United States Patent [19]
Kaneko et al.

[11] Patent Number: 5,750,951
[45] Date of Patent: May 12, 1998

[54] POWER SUPPLY SYSTEM FOR AN ELECTRIC DISCHARGE MACHINE

[75] Inventors: Yuji Kaneko, Yokohama; Tadao Ueda, Sakai; Yoshihiro Watanabe; Tatsuo Toyonaga, both of Yokohama, all of Japan

[73] Assignee: Sodick Co., Ltd., Japan

[21] Appl. No.: 495,627

[22] PCT Filed: Feb. 17, 1995

[86] PCT No.: PCT/JP95/00232

§ 371 Date: Aug. 4, 1995

§ 102(e) Date: Aug. 4, 1995

[87] PCT Pub. No.: WO95/22426

PCT Pub. Date: Aug. 24, 1995

[30] Foreign Application Priority Data

Feb. 18, 1994 [JP] Japan ................... 6-59777

[51] Int. Cl.⁶ .................. B23H 1/02; B23H 7/04
[52] U.S. Cl. .................. 219/69.18; 219/69.12
[58] Field of Search .................. 219/69.13, 69.18, 219/69.12; 204/224 M; 205/658, 659

[56] References Cited

U.S. PATENT DOCUMENTS

| | | | |
|---|---|---|---|
| 4,277,668 | 7/1981 | Inoue | 219/69.17 |
| 4,447,695 | 5/1984 | Inoue | 219/69.13 |
| 4,516,009 | 5/1985 | Inoue | 219/69.18 |
| 4,659,894 | 4/1987 | Inoue | 219/69.18 |
| 5,019,685 | 5/1991 | Nishimura | 219/69.13 |

FOREIGN PATENT DOCUMENTS

| | | | |
|---|---|---|---|
| 56-15927 | 2/1981 | Japan . | |
| 59-232726 | 12/1984 | Japan . | |
| 61-219518 | 9/1986 | Japan | 219/69.13 |
| 62-16770 | 4/1987 | Japan . | |
| 1-240223 | 9/1989 | Japan . | |
| 4-304929 | 10/1992 | Japan . | |

OTHER PUBLICATIONS

Journal of the Japan Society of Electrical Machining Engineers, vol. 24/No. 27 (English Abstract).

Kiyonori Masui, (Jul. 1993) Study On Characteristics of A Wire-Cut Electro-erosion Machined Surface Of A Mold Steel And Improvement Of Of Surface (pp. 65–105).

*Primary Examiner*—Geoffrey S. Evans

[57] ABSTRACT

A transformer converts high frequency pulses, transmitted through a coaxial cable from a power supply unit positioned at a distance from a gap formed between a tool electrode and a workpiece and having a direct current power supply and switching element, into high frequency alternating current pulses, and is connected to that gap. The transformer includes a ring core, a primary winding connected to the coaxial cable, and a secondary winding connected to the gap. Preferably, these windings will have a minimum number of turns. Further, a bypass means is provided which selectively passes the direct current pulse from the direct current power supply or the alternating current pulse induced in the transformer to the gap. It is preferable to house the bypass means and the transformer in a single case positioned in the vicinity of the gap.

19 Claims, 6 Drawing Sheets

POWER SUPPLY SYSTEM FOR AN ELECTRIC DISCHARGE MACHINE

TECHNICAL FIELD

The present invention relates to a power supply system for use in an electric discharge machine (EDM). More specifically, it relates to a power supply system for use in a wire cut EDM which uses a traveling wire as a tool electrode and generates an electric discharge in the space between the wire electrode and a workpiece so as to machine a desired profile into the workpiece.

BACKGROUND

Electric discharge machines are conventionally equipped with a power supply which supplies a series of controlled power pulses to the machining space—the "gap"—formed between the tool electrode and a conductive workpiece. The workpiece is positioned in a work tank, and the gap is filled with a dielectric fluid such as kerosene or de-ionized water having a high relative resistance. Application of a power pulse to the gap causes the dielectric fluid to ionize and an electric discharge to be generated when the voltage across the gap reaches a certain value. As a result, an electric discharge flows through the gap, and a small portion of the workpiece material vaporizes or fuses, after which it is washed away from the gap by the flow of dielectric fluid. In this way, small crater-like holes are formed in the surface of the workpiece. Insulation across the gap is restored at the cessation of each power pulse application. Electric discharge machining is a process for the precision manufacturing of parts, dies, etc. by generating many electric discharges across a gap while moving the tool electrode relative to the workpiece. It is appropriate for the machining of hard metals.

Typically, a power pulse is produced by a power supply unit which is unavoidably positioned at a certain physical distance from the machine section parts which support the workpiece, and which include the mechanical parts for moving the tool electrode relative to the workpiece. The power supply unit is housed in a cabinet and includes an electrical part which produces the power pulses, as well as a control device which controls the amount of energy in a pulse, the pulse polarity, the pulse ON and OFF times, and the relative movement between the tool electrode and the workpiece. The power supply unit is connected to the machine section by appropriate conductors.

In a wire cutting electric discharge machine, a wire which travels between a pair of wire guides so as to be perpendicularly opposed to the workpiece is normally used as the tool electrode. During machining, as power pulses are applied across the gap and machining progresses, the traveling wire is moved relative to the workpiece in such a way that the axis of the traveling wire approaches the workpiece. When machining a desired profile into the workpiece, wire cut EDM machining is similar to conventional machining performed using a band saw blade.

It is known that during machining, when a wire under tension is traveling at a certain speed between the pair of wire guides, there is a slight vibration of the wire between wire guides. Because of this undesirable wire vibration, the portion of the workpiece which faces the wire is eroded unequally, more in the center than at the top and bottom surfaces, resulting in an adverse effect on product shape accuracy. Increasing the wire travel speed tends to improve wire straightness. Further, increasing the amount of energy supplied to the gap per unit time tends to reduce the amplitude of wire vibration caused by the pressure of the electric discharges on the wire. However, when power pulses having a small energy per pulse are required at the gap, reducing the amplitude of wire vibration may not be sufficient. For example, after a given profile is roughly machined into the workpiece by moving the wire along a prescribed path, machining pulses having a small energy per power pulse are usually used for the so-called "second cut" to improve the roughness of the machined workpiece surface, during which the wire is moved over a path which is offset from the prescribed path. In order to restore sufficient insulation across the gap after each electric discharge is completed, the OFF time between power pulses cannot be made excessively short, so the ability to increase the frequency of the power pulses is limited.

The object of the present invention is to provide a power supply system for a wire cut elecric discharge machine which increases the energy per unit time supplied to the gap by supplying a series of power pulses to the gap at a high repeating frequency, and as a result reduces wire vibration.

Another object of the present invention is to provide a power supply system for an electric discharge machine which improves machining efficiency by supplying a series of power pulses to the gap having a high repeating frequency.

A further object of the present invention is to supply a power supply system for an electric discharge machine capable of supplying power pulses of different amplitudes and repeating frequencies.

Other objects of the present invention will be partially described in the explanation which follows, and will be partially apparent to practitioners of the art through implementation of the invention.

SUMMARY OF THE INVENTION

To achieve the above objects, the present invention provides a power supply system for an electric discharge machine which machines a workpiece using electric discharges by supplying power pulses to the machining gap formed between a tool electrode and a workpiece, which comprises a direct current power supply, a pulse generating means which generates a series of pulse signals having a controlled ON time and a controlled OFF time, a switch which is connected in series with the direct current power supply and which converts the flow of direct current from the direct current power supply into pulses in response to a controlled pulse signal, a first conductor, one end of which is connected to one terminal of the direct current power supply, a second conductor, one end of which is connected to the other terminal of the direct current power supply, a cable such as a coaxial cable or stranded wire which transmits the direct current pulses which flow through the switch to the vicinity of the machining gap and whose line inductance is small, and a conversion means which is connected on the input side to the other end of the first conductor and to the other end of the second conductor, and is connected on the output side to the machining gap and positioned in the vicinity of the machining gap, and which converts the direct current pulses which flow from the direct current power supply through the switch into alternating current pulses, such that alternating current pulses flow through the machining gap.

The transformer preferably has a ring core, a primary winding wound around the ring core which is connected to one end of the cable, and a secondary winding wound around the ring core which is connected to the machining gap. Energy transmitted from the direct current power supply to the primary winding is passed to the secondary winding by electromagnetic induction.

Furthermore, it is preferable that the number of coil windings in the transformer be as few as possible.

The power supply system will also preferably include a means to electrically selectively bypass the conversion means so that direct current pulses from the direct current power supply can be caused to flow through the machining gap. The bypass means and conversion means may be housed together in a single case positioned in the vicinity of the machining gap.

PREFERRED EMBODIMENT OF THE INVENTION

Figure 1:
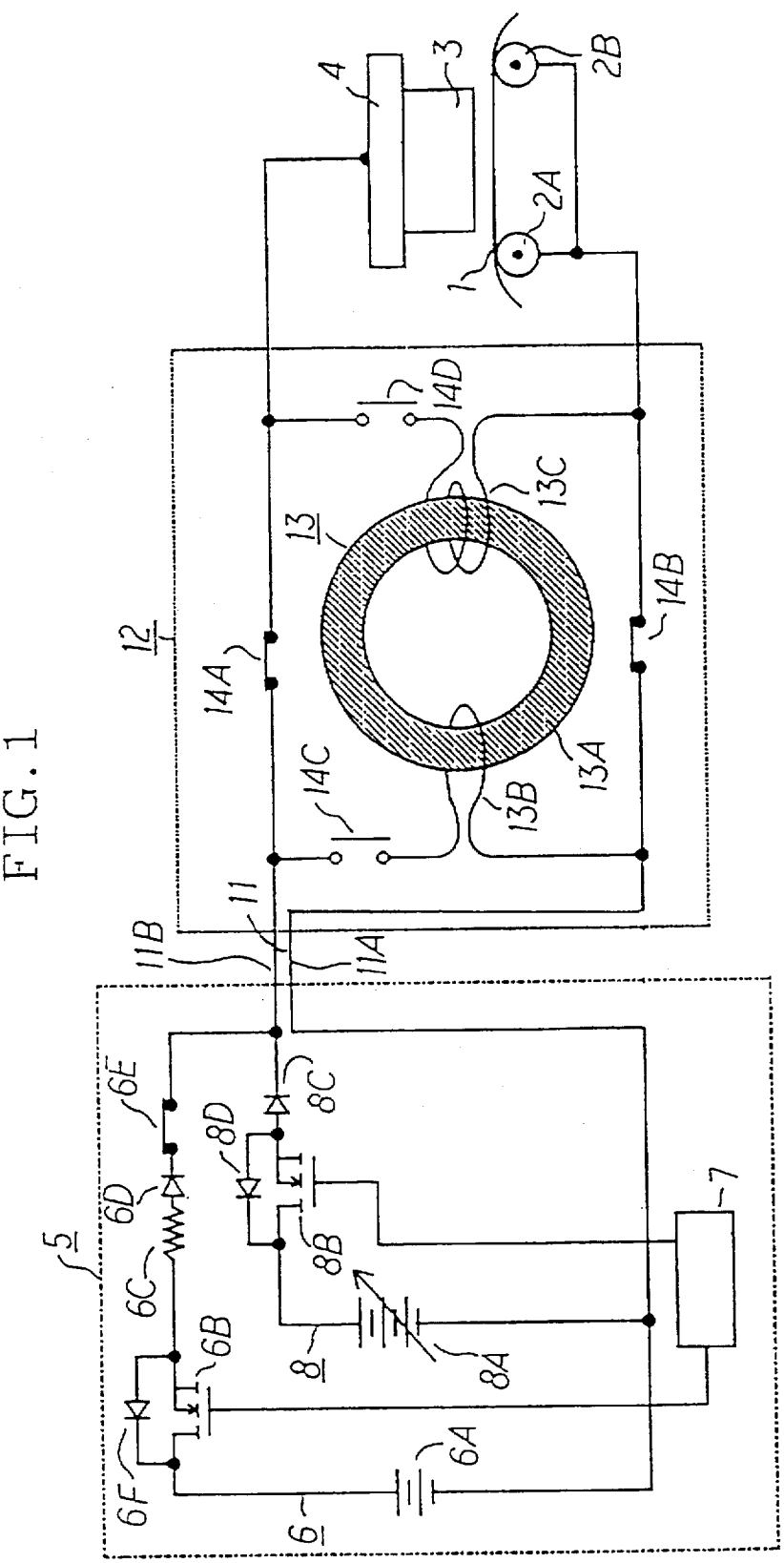
FIG. 1 is a simplified block diagram illustrating a power supply system in accordance with one embodiment of the present invention.

The present invention will now be described with reference to drawings. FIG. 1 depicts a power supply system for a wire cut elecric discharge machine in accordance with an embodiment of the present invention which includes a machining unit and a power supply unit 5, which is positioned at a physical distance from the machining unit.

The machining unit includes a wire 1 which travels between a pair of wire guides 2A and 2B at a prescribed interval from a workpiece 3 which is attached to a work stand 4, the wire being positioned so as to face the workpiece 3 and held at a prescribed tension. The work stand 4 is mounted on an XY cross table (not illustrated) capable of moving in a plane which is perpendicular to the wire 1. Although not illustrated, the machining unit includes, for example, a mechanical part which causes the wire 1 to run from a wire bobbin to the gap, and a part which introduces dielectric fluid to the gap.

The power supply unit 5 includes a direct current power supply 6A and a circuit 6 which includes a switching element 6B and a current limiting resistor 6C connected in series to the direct current power supply 6A. In order to make the explanation of the embodiment simpler and more apparent, only one direct current combination, made up of the switching element 6B and current limiting resistor 6C, is shown in the illustrated embodiment. In order to to enable free selection of the value of the current which flows through the circuit 6, additional direct current combinations may be provided which are connected in parallel to the direct current combination and in series to the direct current power supply 6A. The circuit 6 further includes a reverse-current protection diode 6D, a switch 6E, and a diode 6F which protects the switching element 6B from surge currents.

The power supply unit 5 further includes a circuit 8 connected in parallel to the circuit 6, which comprises a variable direct current power supply 8A, a switching element 8B connected to the power supply 8A, a reverse current protection diode 8C and a diode 8D which protects switching element 8B. The switching elements 6B and 8B may comprise, for example, an electronic switch such as a MOS-FET transistor. The circuit 8 has no substantial resistance, so the direct current pulse which flows through the switching element 8B from the direct current power supply 8A has very steep rising and falling edges, and is favorable for supplying a high frequency direct current pulse to the machine section. The switching element 8B operates in its unsaturated region, and the peak value of the amplified current pulse is maintained by controlling the time during which the switching element 8B is closed.

Further, a pulse signal generating device 7 is provided which separately supplies pulse signals having an ON time and OFF time to the switching elements 6B and 8B. The switching elements 6B and 8B respond to the respective pulse signals and operate so as to close during the pulse signal ON time. The pulse signal generating device 7 includes a controller which controls the pulse signal ON time and OFF time. Typically, in wire cut elecric discharge machines it is preferable to supply a power pulse with a relatively short ON time. While it depends on the prescribed surface roughness of the machined workpiece 3 and on the workpiece 6 material, normally a power pulse having an ON time of several µS, and at the most several 10's of µSs, is used.

Conductors 11A and 11B, which connect the machine section of the wire cut elecric discharge machine to the power supply unit 5, are comprised so that line inductance can be reduced as much as possible, such that the current pulses flowing through the gap will have steep rising and falling edges. For example, a coaxial cable 11 is used in which conductors 11A and 11B are coaxially oriented. Stranded wire can also be used to connect the machine section to the power supply unit 5. In the illustrated embodiment, the conductor 11A is connected on one end to the cathodes of the direct current power supplies 6A and 8A, and on the other end to the wire. Conductor 11B is connected on one end to the anodes of the direct current power supplies 6A and 8A, and on the other end to the workpiece 3.

A transformer 13 is provided which is positioned in the vicinity of the gap and which converts a direct current pulse transmitted from the direct current power supply 8A through the switching element 8B and the coaxial cable 11 into an alternating current pulse. The transformer 13 includes a ferrite ring core 13A having only small high frequency loss and a primary winding 13B and secondary winding 13C wound around the ring core 13A. The ring core 13A has, for example, an outside diameter of 55 mm and inside diameter of 30 mm, and is formed by superimposing two ferrite toroidal cores. The windings 13B and 13C may, for example, include conductors coated with teflon resin. The primary winding 13B is connected to the conductors 11A and 11B, and the secondary winding 13C is connected to the gap. In order to maintain the direct current high frequency pulse waveform sent from the direct current power supply 8A through the switching element 8B, it is desirable to make the number of primary windings 13B as small as possible. Similarly, in order to maintain the alternating current high frequency pulse waveform induced in the secondary winding 13C, it is desirable to make the number of primary windings 13B as small as possible. Because the energy per current pulse during a second cut is relatively small during electric discharge, the primary and secondary windings 13B and 13C in the illustrated embodiment are respectively wound one turn and two turns, so as to supply a high repeating frequency current pulse to the gap. Therefore the ratio of windings between the primary winding 13B and the secondary winding 13C is 1:2, and the effective [rms] voltage value of the voltage across the winding 13C is 2 times the voltage across winding 13B, while the current value in winding 13C is ½ that of 13B. The sum of the number of windings should preferably be between 1 and 4.

The circuit 8 has no substantial resistance, and can therefore easily increase the peak value of the direct current pulse sent through the switching element 8B. It is therefore easily possible to supply an alternating current high frequency pulse having a relatively high current value to the gap without changing the winding ratio between the primary winding and the secondary winding.

In the present invention, the transformer 13 is housed in a compact case 12. Switches 14A, 14B, 14C, and 14D are also housed in the case 12. The switch 14A, positioned between the conductor 11B and the workpiece 3, and the switch 14B, positioned between the conductor 11A and the wire 1, operate simultaneously. The switch 14C, positioned between the conductor 11B and the primary winding 13B, and the switch 14D, positioned between the secondary winding 13C and the workpiece 3, are controlled simultaneously, and operate inversely to the opening and closing of the switches 14A and 14B. When a direct current pulse of the desired value is supplied to the gap from the circuit 6 or the circuit 8 or from both the circuits 6 and 8, the switches 14A and 14B are closed, and the switches 14C and 14D are open. When a high frequency alternating current pulse is supplied from the circuit 8 to the gap, the switches 14A and 14B are open and the switches 14C and 14D are closed.

The operation of the power supply system in FIG. 1 is now described with reference to FIG. 2A, FIG. 2B, FIG. 2C, FIG. 2D and FIG. 2E. FIG. 2A, FIG. 2B, FIG. 2C, FIG. 2D, and FIG. 2E respectively illustrate the waveforms for the voltage of the pulse signal supplied from the pulse signal generation circuit 7 to the switching element 8B, the direct current pulse sent from the direct current power supply 9A through the switching element 8B to the primary winding 13B, the voltage induced in secondary winding 13C, the voltage applied to the gap, and the current flowing at the gap.

Figure 2:
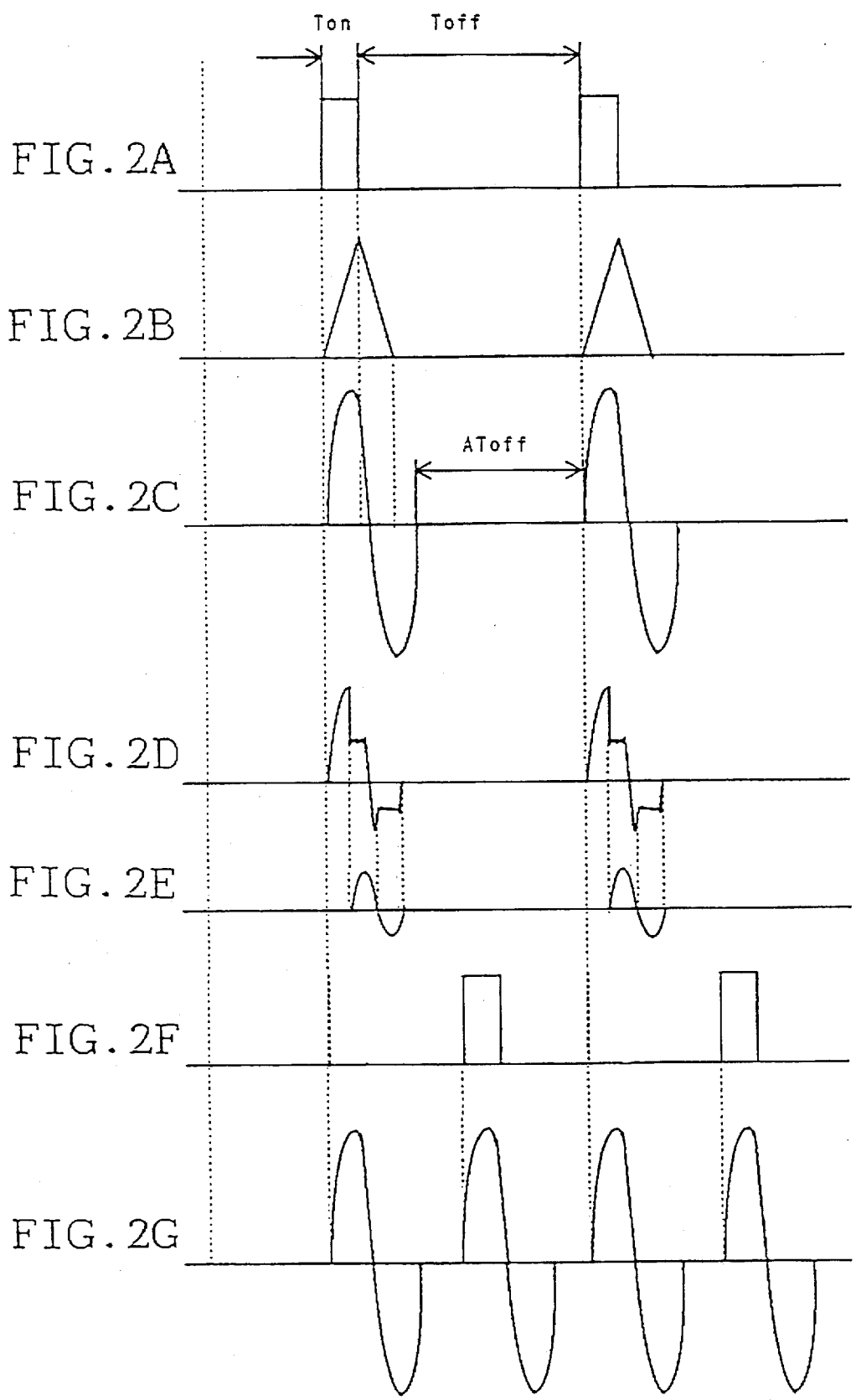
FIG. 2A, FIG. 2B, FIG. 2C, FIG. 2D, FIG. 2E, FIG. 2F and FIG. 2G are timing charts illustrating voltage and current waveforms relating to the power supply system.

With the switch 6E and the switches 14A and 14B open, and with the switches 14C and 14D closed, the pulse signal generating circuit 7 supplies a pulse signal, as shown in FIG. 2A, to the switching element 8B for which the pulse hold time—which is to say the ON time $T_{ON}$—and the pulse repeat cycle—which to say the OFF time $T_{OFF}$—are set. For example, when it is required that the workpiece 3 be machined to a relatively smooth surface roughness of between 0.5 and 3.5 R max, $T_{ON}$ should be set to 50 ns~500 ns, and $T_{OFF}$ to 500 ns~several 10s of μs. The direct current supplied to the primary winding 13B through the coaxial cable 11, as shown in FIG. 2B, rises rapidly after passing through the switching element 8B and falls rapidly when ON time $T_{ON}$ ends. When a direct current pulse is generated in the primary winding 13B, an alternating current is induced in the secondary winding 13C and the voltage in FIG. 2C is applied to the gap. After a certain no-load period, an electrical discharge is generated in the gap and, as shown in FIG. 2E, an alternating current pulse flows through the gap and the workpiece 3 is machined.

As will be apparent to practitioners of the art, the OFF time $T_{OFF}$ is set so that $AT_{OFF}$, which is the voltage pulse repeat cycle in FIG. 2C, does not become excessively short. Since the alternating current pulse flows through the gap, the insulating effect of the gap is immediately restored even if $AT_{OFF}$ is short. Therefore it is possible to set the OFF time $T_{OFF}$ to a small value. Also, in comparison to a direct current flow through the gap, electrolytic effects on the workpiece surface are prevented.

The transformer 13 and the switches 14A, 14B, 14C, and 14D, all of which are housed together in the case 12, will now be described with reference to FIG. 3, FIG. 4, and FIG. 5.

Figure 3:
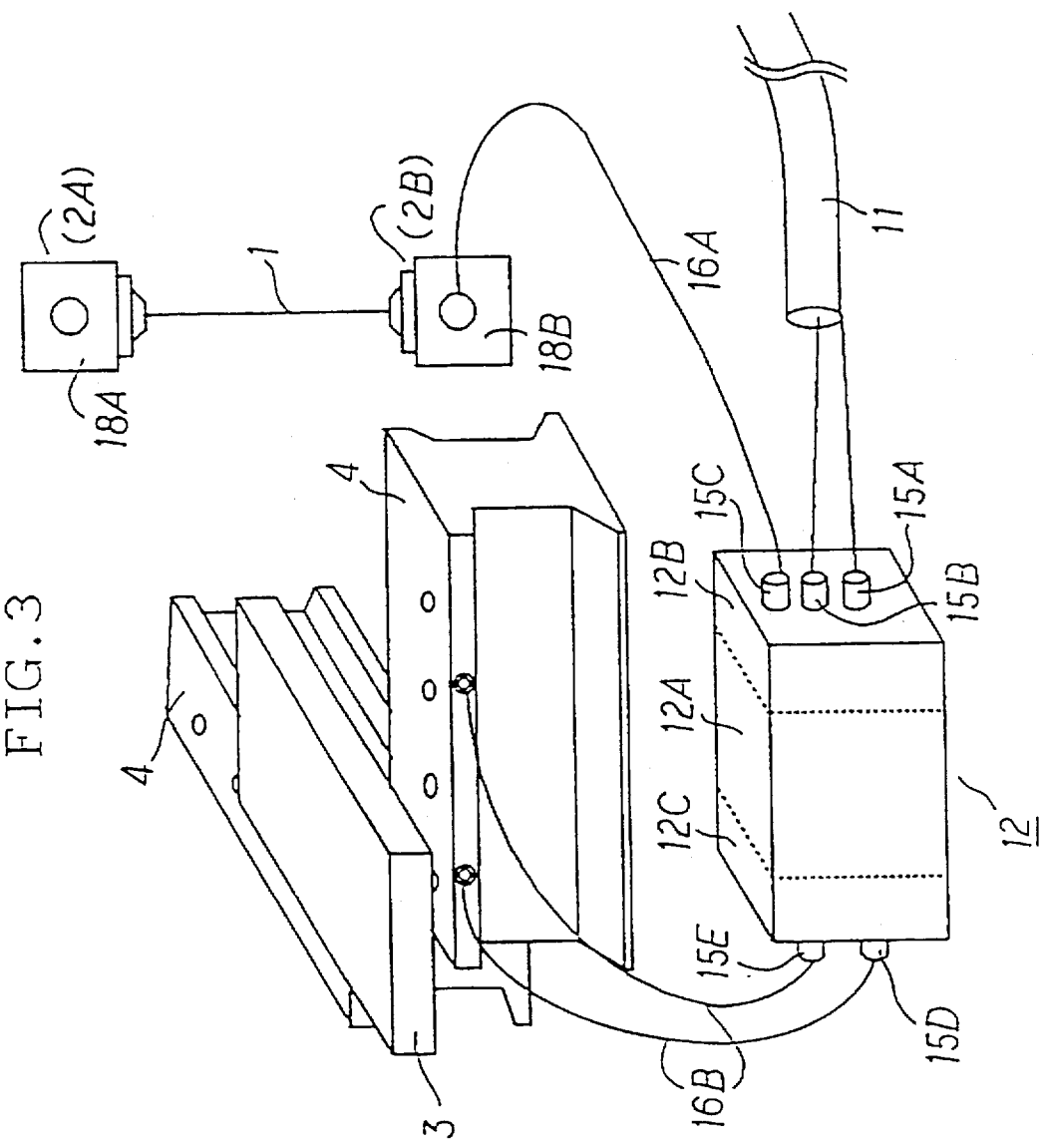
FIG. 3 is a simplified diagram illustrating a transformer for converting direct current to alternating current and the position of the case which houses the transformer and a transformer-bypass switch.

As is best shown by FIG. 3, case 12 may be a quadratic prism-shaped small box, positioned adjacent to a work stand 4 which is supported in the work tank or a work pan (not shown). The workpiece 3 is fastened to the work stand 4 and faces the wire electrode 1, which is strung between the pair of wire guides 2A and 2B under a prescribed tension. The wire guides 2A and 2B define a perpendicular axis with respect to the contour path to be cut in the workpiece 3 and are respectively housed in guide units 18A and 18B, which may be equipped with nozzles to jet the dielectric fluid toward the gap.

The case 12 has terminals 15A, 15B, 15C, 15D and 15E. The terminals 15A and 15B are connected to the end of coaxial cable 11 over a minimum distance using, for example, stranded wire. Similarly, the terminal 15C is connected to one of the guide units 18A and 18B, using, for example, the stranded wire 16A, and the terminals 15D and 15E are connected to the work stand 4 using the stranded wire 16B, each over a minimum distance. In place of stranded wire 16B, a metal plate having terminals 15D and 15E may be attached to the edge of work stand 4 using appropriate screws or welding. Thus the high frequency alternating current produced in transformer 13 is supplied to the gap formed between the workpiece 3 and the wire 1 over the minimum distance, so that a high frequency current can be caused to flow through the gap.

Figure 4:
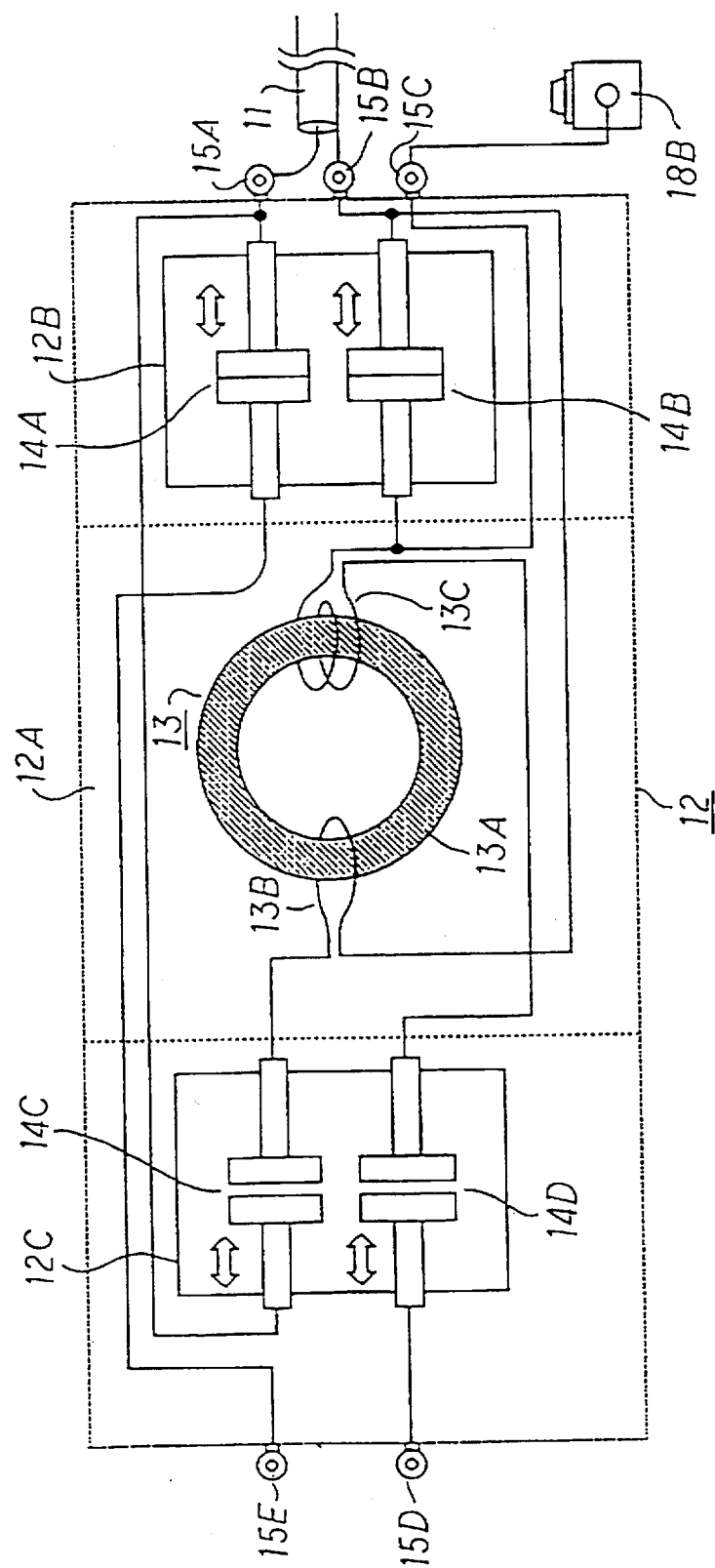
FIG. 4 is a simplified block diagram illustrating a circuit in the case shown in FIG. 3.

As best shown in FIG. 4, the case 12 is divided into chambers 12A, 12B, and 12C. Chamber 12B is closest to the terminals 15A, 15B, and 15C, and houses the switches 14A and 14B. Chamber 12A is adjacent to chamber 12B, and houses the transformer 13. Chamber 12C is adjacent to chamber 12A, is closest to the terminals 15D and 15E, and houses the switches 14C and 14D.

Figure 5:
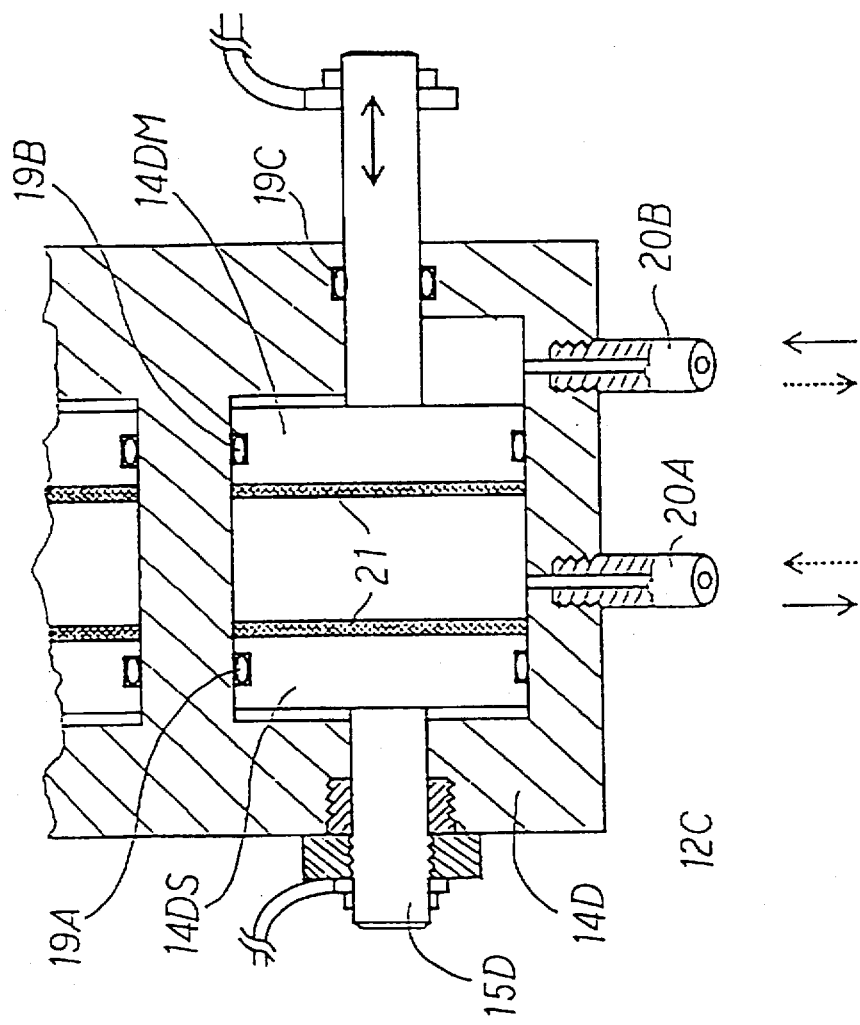
FIG. 5 is a section drawing illustrating one of the switches of FIG. 4 in detail.

Referring now to FIG. 5, a structure having multiple switches housed in the case 12 will be described in detail using the example of the switch 14D.

The well known butt-contact type switch 14D includes a stationary contact 14DS which has a contact surface 12 and a contact 14DM which has a contact surface 21 and moves at right angles to the contact surface 21. The respective contact surfaces 21 of the contacts 14DS and 14DM are formed so as to favorably conduct a high frequency power pulse. The relative movement between the contact surfaces of the contacts 14DM and 14DS is controlled by selectively supplying a fluid to the chamber 12C through one of the holes 20A and 20B from a fluid source (not shown) disposed outside of the chamber 12C. The switch 14D may include seals 19A, 19B, and 19C, such as O-rings, appropriately positioned to prevent fluid leakage.

Figure 6:
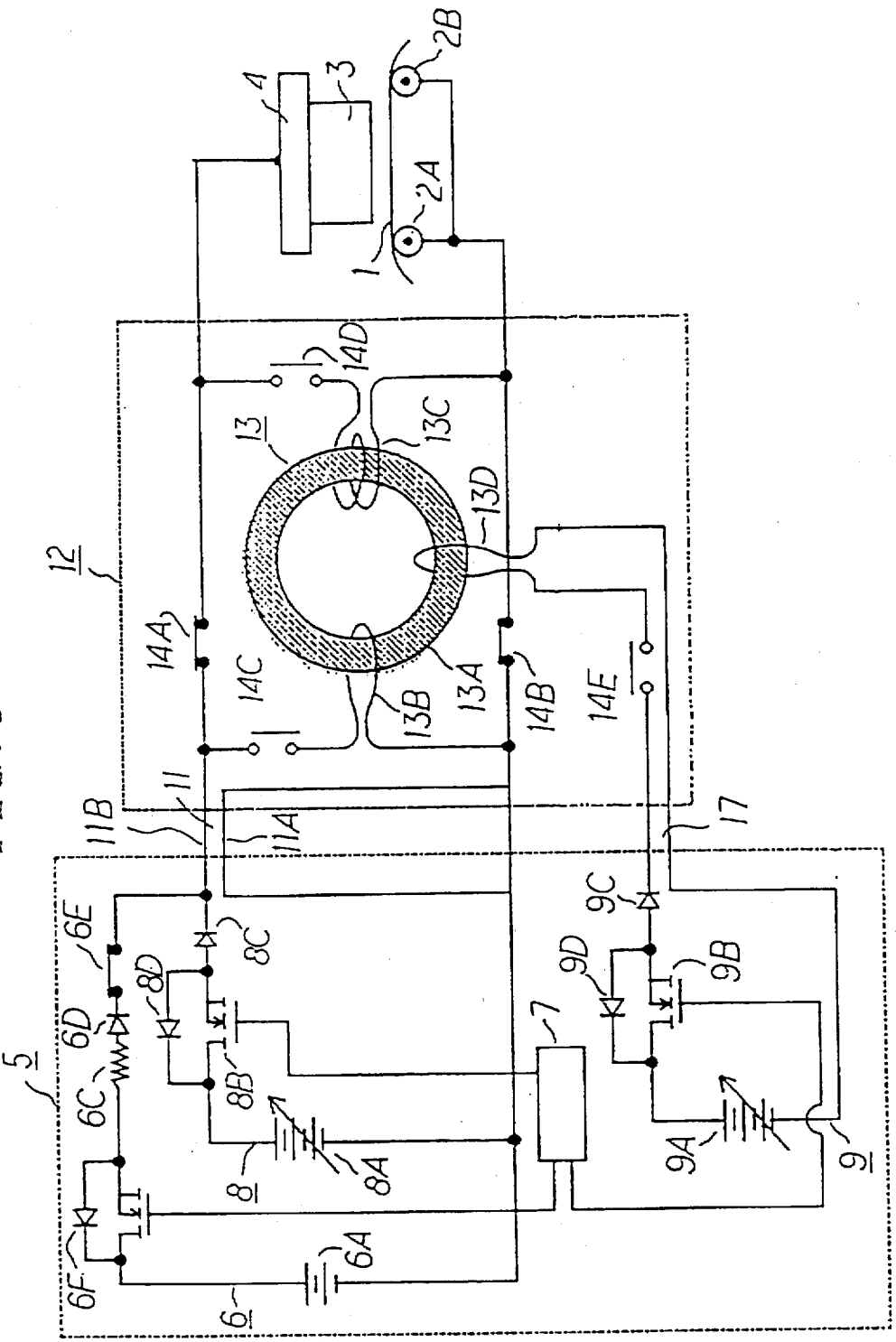
FIG. 6 is a simplified block diagram illustrating a power supply system in accordance with another embodiment of the present invention.

FIG. 6 illustrates a power supply system in accordance with another embodiment of the present invention. The same reference numerals are assigned to elements corresponding to those described in FIG. 1, and an explanation thereof is omitted.

In the illustrated embodiment, an additional circuit 9 is provided which produces a direct current pulse and which includes a variable direct current power supply 9A, a switching element 9B, a reverse current protection diode 9C, and a diode 9D which protects the switching element 9B. Except for the operational timing of the switching element 9B, the circuit 9 has the same constitution as the circuit 8, and a detailed description of its elements is omitted. A winding 13D, which is further connected to the circuit 9 through a coaxial cable 17 and wound around core 3A, is positioned in the case 12. A switch 14E is positioned between the winding 13D and the coaxial cable 17.

The operation of the power supply system will be described with reference to FIG. 2A, FIG. 2F, and FIG. 2G, which respectively illustrate the waveforms of the pulse signal voltage supplied from the pulse signal generating circuit 7 to the switching element 9B and the voltage induced in the secondary winding 13C.

With the switches 6E, 14A and 14B closed and the switches 14C, 14D and 14E open, the pulse signal generating circuit 7, as shown in FIG. 2A, supplies a pulse signal to the switching element 8B for which the pulse duration—the ON time—is set to $T_{ON}$, and the pulse repeating cycle—the OFF time—is set to $T_{OFF}$. As a result, a voltage pulse, as shown in FIG. 2G, having a repeating frequency which is even higher than that of the voltage in FIG. 2C is generated at the secondary winding 13C, and an extremely high frequency alternating current pulse for machining the workpiece 3 flows through the gap.

The purpose of the present invention is not limited to precisely the forms disclosed. In light of the above description, it will be clear that many improvements and variations are possible. For example, the case 12 in the embodiment is positioned so as to be adjacent to the work stand 4, but it could also be affixed to the side wall of the work tank or to the respective arms which support the guide units 18A and 18B. The above embodiment was selected for the purpose of explaining the essence and practical application of the invention. The scope of the invention is defined in the appended claims.

What is claimed is:

1. A power supply for an electric discharge machine for machining a workpiece by supplying a power pulse to a machining gap formed between a tool electrode and a workpiece, said power supply comprising:
    a direct current source;
    a pulse generating means for generating a series of pulse signals having a controlled ON time and a controlled OFF time;
    a switch connected in series with said direct current source and responsive to said pulse signals for converting the direct current from said direct current source into direct current pulses;
    a low inductance cable for carrying the direct current pulses from said switch to the vicinity of said machining gap, said cable comprising first and second conductors, each having first and second ends the first ends of said first and second conductors being connected to said direct current source and;
    a direct to alternating current converter positioned in the vicinity of said machining gap and having an input and an output, the input being connected to the second ends of the said first and second conductors, and the output being connected to the machining gap for delivering alternating current pulses to the machining gap.

2. The power supply according to claim 1 wherein the said low inductance cable comprises a coaxial cable.

3. The power supply according to claim 1 wherein the said direct to alternating current converter includes a transformer having a primary winding connected to one end of said cable and a secondary winding connected to the machining gap, for passing energy supplied to the primary winding from the said direct current source to the secondary winding by electromagnic induction.

4. The power supply according to claim 3 wherein the transformer includes a ring core for conducting an induction current.

5. The power supply according to claim 3 wherein the primary winding has a minimum number of windings effective to maintain the direct current pulse waveform.

6. The power supply according to claim 5 wherein the number of primary windings is 1.

7. The power supply according to claim 6 wherein the sum of primary and secondary windings is 4 or less.

8. The power supply according to claim 1 wherein the direct current source includes a variable direct current source.

9. The power supply according to claim 8 wherein said variable direct current source and said series connected switch comprise a substantially no resistance circuit whereby current in said circuit may rise and fall steeply.

10. The power supply according to claim 1 further comprising a mean for electrically bypassing the direct alternating current converter.

11. The power supply according to claim 10 wherein the bypass means comprises a third conductor, one end of which is connected to the other end of the first conductor, and the other end of which is connected to one of the tool electrode or the workpiece, a fourth conductor, one end of which is connected to the other end of the second conductor, and the other end of which is connected to the other of the tool electrode or the workpiece, and a switch for controlling the flow of current through the third and fourth conductors.

12. The power supply according to claim 1, wherein the direct to alternating converter and the switch are disposed in a signal housing positioned in the vicinity of the machining gap.

13. The power supply according to claim 1 further comprising a second direct current source, a second switch connected in series with the second direct current source and responsive to the pulse generating means for converting the direct current from said second direct current source into direct current pulses;
    and a second low inductance cable for carrying the direct current pulses from said second switch to said direct to alternating current converter.

14. The power supply according to claim 1 further comprising a power circuit having fixed voltage source, a switch connected in series therewith and responsive to said pulse generating means, and a series connected current limiting resistance, said power circuit being connected in parallel with said direct current source and said switch connected in series with said direct current source.

15. A method of electric discharge machining a workpiece positioned across a machining gap from an electrode generating a direct current;
    generating a direct current;
    generating a control signal having a controllable ON time and OFF time;
    using said control signal to generate a direct current pulse train having a first period from said direct current;
    converting said direct current pulse train into an alternating current pulse train having multiple pulses in said period;
    selectively applying either said alternating current pulse train or said direct current pulse train to said machining gap.

16. The method according to claim 15 further comprising the step of varying the ON time in accordance with the desired workpiece surface roughness.

17. The method according to claim 15 further comprising the step of controlling the OFF time to be sufficiently long to minimize electrolytic effects on the workpiece.

18. The method according to claim 17 wherein when applying the alternating current pulse train to the machining gap the effective OFF time is smaller in comparison to the OFF time when machining with direct current machining pulses.

19. The method according to claim 15 further comprising the steps of:

a generating a second direct current pulse train;

converting said second direct current pulse train to a second alternating current pulse train, having pulses shifted in time from the pulses from the pulses of said first mentioned alternating current pulse train; and applying said alternating current pulse train and said second alternating current pulse train to said machining gap to thereby create a composite pulse train having a higher pulse repetition rate than said first mentioned alternating current pulse train.

* * * * *